United States Patent [19]

Lieser

[11] Patent Number: 4,726,720
[45] Date of Patent: Feb. 23, 1988

[54] METHOD OF MILLING TEETH SURFACES FROM THE FREE END OF A WORKPIECE

[75] Inventor: Karl Lieser, Wuppertal, Fed. Rep. of Germany

[73] Assignee: Wera Werk Hermann Werner GmbH & Co., Wuppertal, Fed. Rep. of Germany

[21] Appl. No.: 921,852

[22] Filed: Oct. 21, 1986

Related U.S. Application Data

[63] Continuation of Ser. No. 844,265, Mar. 25, 1986, abandoned, which is a continuation of Ser. No. 545,796, Oct. 26, 1983, abandoned.

[30] Foreign Application Priority Data

Oct. 29, 1982 [DE] Fed. Rep. of Germany ....... 3240165

[51] Int. Cl.⁴ .............................................. B23F 19/10
[52] U.S. Cl. ....................................................... 409/9
[58] Field of Search .................... 409/8, 9, 50, 55, 199, 409/201, 203

[56] References Cited

U.S. PATENT DOCUMENTS

| | | | |
|---|---|---|---|
| 2,184,232 | 12/1939 | Christman | 409/8 |
| 2,296,270 | 9/1942 | Cross | 409/8 |

FOREIGN PATENT DOCUMENTS

| | | | |
|---|---|---|---|
| 867636 | 2/1953 | Fed. Rep. of Germany | 409/201 |
| 898987 | 12/1953 | Fed. Rep. of Germany | 409/9 |
| 1048762 | 1/1959 | Fed. Rep. of Germany | 409/9 |
| 2731793 | 1/1979 | Fed. Rep. of Germany | 409/9 |
| 2734901 | 2/1979 | Fed. Rep. of Germany | 409/8 |
| 3000295 | 7/1981 | Fed. Rep. of Germany | 409/8 |
| 646355 | 9/1962 | Italy | 409/8 |
| 931198 | 1/1961 | United Kingdom | 409/8 |

Primary Examiner—Gil Weidenfeld
Assistant Examiner—Daniel W. Howell
Attorney, Agent, or Firm—Martin A. Farber

[57] ABSTRACT

A method of milling, with at least one milling cutter, teeth surfaces at an axial free end of a continuously rotatably driven workpiece comprising the steps of cutting the teeth on the continuously driven workpiece with axial relative movement between the workpiece and the milling cutter by rotating the milling cutter with constant speed relative to the rpm pf the workpiece and in the direction of an axial face of the free end of the workpiece, by the rotating milling cutter milling a roof-like surface on one side of the teeth of the workpiece always starting from an axially inwardly located basde of the teeth in a direction toward a ridge of the teeth in every milling, the roof-like surfaces of each tooth tapering toward each other away from the base of said each tooth toward the ridge adjacent the axial face of the free end of the workpiece.

4 Claims, 10 Drawing Figures

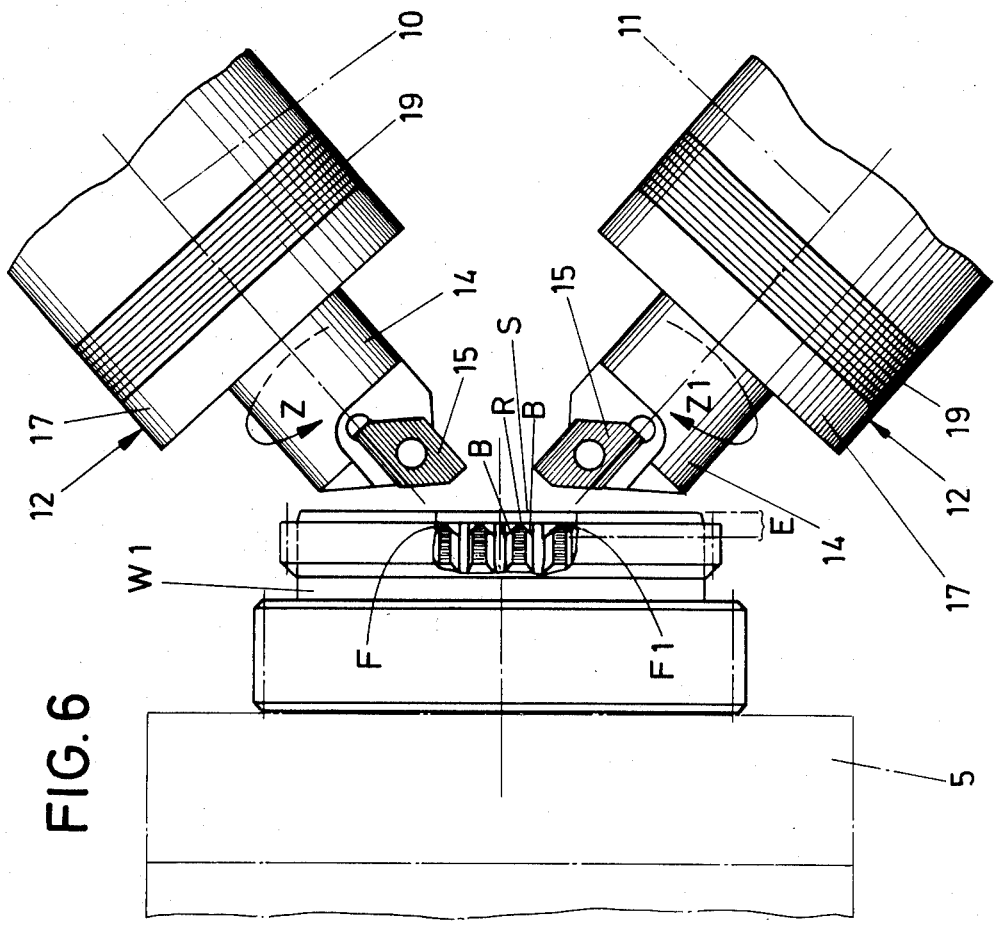
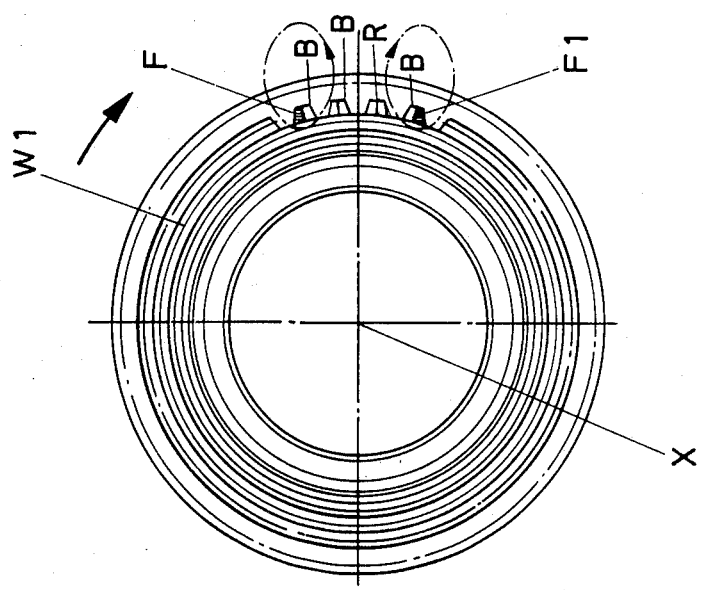

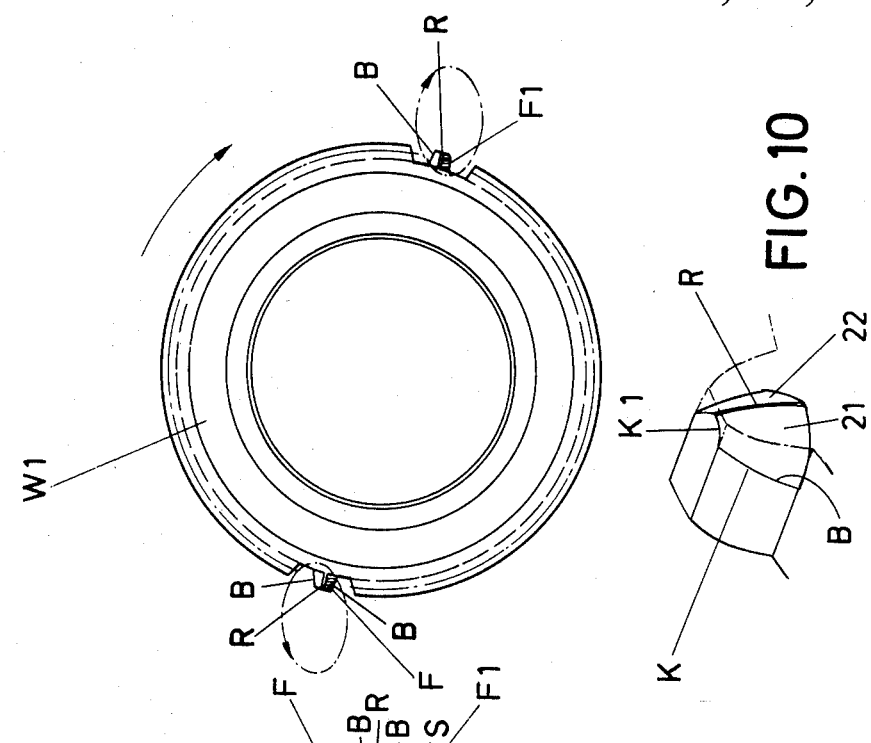
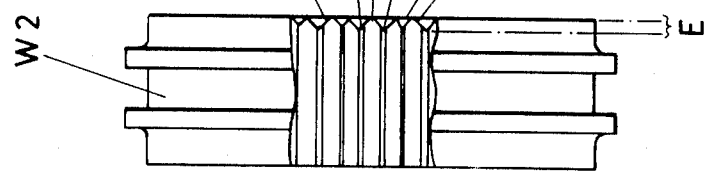
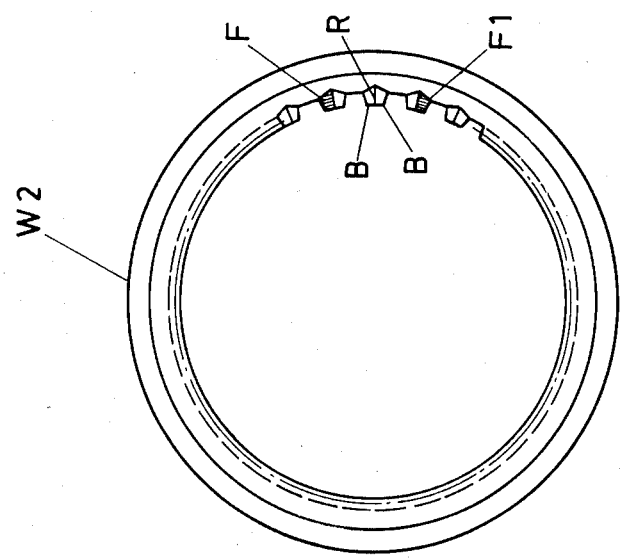

METHOD OF MILLING TEETH SURFACES FROM THE FREE END OF A WORKPIECE

RELATED APPLICATION

This application is a continuation of my copending application Ser. No. 844,265, filed Mar. 25, 1986, now abandoned, which in turn is a continuation of my originally copending application Ser. No. 545,796, filed Oct. 26, 1983 (now abandoned).

The invention relates to a method for milling of a plurality of surfaces from the free end of a workpiece with relative axial movement between the workpieces and the milling cutter. The milling cutter, which is developed as a single-tooth fly cutter and cuts the continuously driven workpiece, is driven in constant speed relationship to the revolution of the workpiece. The carrier of the axis of rotation of the milling cutter is swingable around an axis extending perpendicular to the axis of rotation of the workpiece in such a manner that the orbital plane of the milling cutter can be brought to an acute angle relative to the axis of rotation of the workpiece.

West German Pat. No. 1 921 514 discloses a machine tool which makes it possible to mill a plurality of longitudinal grooves into the cone point of a Philips screwdriver workpiece or similarly shaped workpieces. This can be done within a short manufacturing time and can be done automatically controlling the operation so as to obtain great accuracy.

In West German OS No. 2 650 955 the carrier of the axis of rotation of the milling cutter is arranged swingably around an axis which is perpendicular to the workpiece so that, by means of a tool cutting edge of the same profile and despite a change in the factors of the tool cutting edge which determine the groove profile, accurately adapted grooves can be produced on the workpiece. A change in the factors is compensated for in this case by merely swinging the carrier through the corresponding angle. Furthermore, different shapes of grooves can be produced on the workpiece by means of a single tool cutting edge without changing the factors which determine the profile of the groove, this being done also by swinging the carrier.

The object of the present invention is to develop a method of the introductory-mentioned type in such a manner that slopes can be produced in a single operation on gear-like workpieces on the face surfaces of the teeth.

It is known that slopes can be produced by an end milling cutter using an indexing method. This, however, is time consuming.

As a result of the present invention, there is created a method of the introductory-mentioned type which is characterized by increased possibilities of use. With this method very different kinds of grooves or surfaces can be produced on workpieces. In addition, it is, however, possible to produce slopes on the face surfaces of teeth on toothed workpieces. This can be done in a single operation, which leads to a considerable saving in manufacturing time. Both internally and externally toothed workpieces can be treated in this way. The carriers are to be brought into such an angular position that one milling cutter intersects the roof-shaped slope disposed in the direction of rotation of the workpiece and the other milling cutter intersects the roof-shaped slope disposed in the opposite direction of travel of the workpiece. This can be achieved with great precision. This measure is supported by the fact that the axes of rotation of the milling cutters can be adjusted centrally towards the carrier axis of swing. As a result of suitable angular positioning of the carriers, the tool cutting edges do not interfere with each other. The angular position is dependent on the diameter of the workpieces and the number of teeth. Slopes produced in this manner, or roof-shaped entrance bevels, are particularly well-suited on the teeth of an index gear or internally toothed push-on sockets so that the teeth can be brought more easily into engagement.

One advantageous further development resides in the fact that the carriers of the axes of rotation of the milling cutters are furthermore adjustable spacially parallel to the carrier axis of swing. Accordingly, the two tool cutting edges can act diametrically on the workpiece.

In addition to this, it is advantageous for the axis of rotation of the work carrier to be displaceable transversely to the carrier axis of swing. On the one hand, this provides the possibility of producing spherical slopes, the curvature in the one plane being obtained by the profile of the cutting edge and the curvature in the other plane by this adjustability. On the other hand, this adjustability makes it possible, without changing the profile of the cutting edge and despite angular displacement of the support, to produce accurate slopes with respect to the central axis of the workpiece.

This measure, in particular, results in advantages in the manufacture of roof-shaped slopes of internally toothed workpieces due to the good accessibility which is then present.

Finally, another favorable feature is that the direction of rotation of the milling cutters is reversible. This affords the possibility of determining the formation of the burr, preferably in the manner that cutting out of the toothing is effected. The burr can then be removed in simple fashion from the outside.

With the above and other objects and advantages in view, the present invention will become more clearly understood in connection with the detailed description of a preferred embodiment, when considered with the accompanying drawings, of which:

FIG. 5 is an end view looking at a workpiece formed with an outer toothing (only some of the teeth being shown for simplicity of illustration), showing the orbital planes of the milling cutters, which are a single-tooth fly cutters.

FIG. 6 is a side view of FIG. 5 showing the single-tooth fly cutters;

FIG. 7 is an end view of an internally toothed workpiece (only some of the teeth being shown for simplicity of illustration);

FIG. 8 shows the internally toothed workpiece, partly in front view and partly in section;

FIG. 9 is an end view of the externally toothed workpiece (only some of the teeth being shown for simplicity of illustration), with the single-tooth fly cutters (not shown) acting diametrically on the workpiece as indicated by their orbital planes; and FIG. 10 shows, in partial perspective view, a tooth of a workpiece with spherical roof-like slopes.

Figure 2:
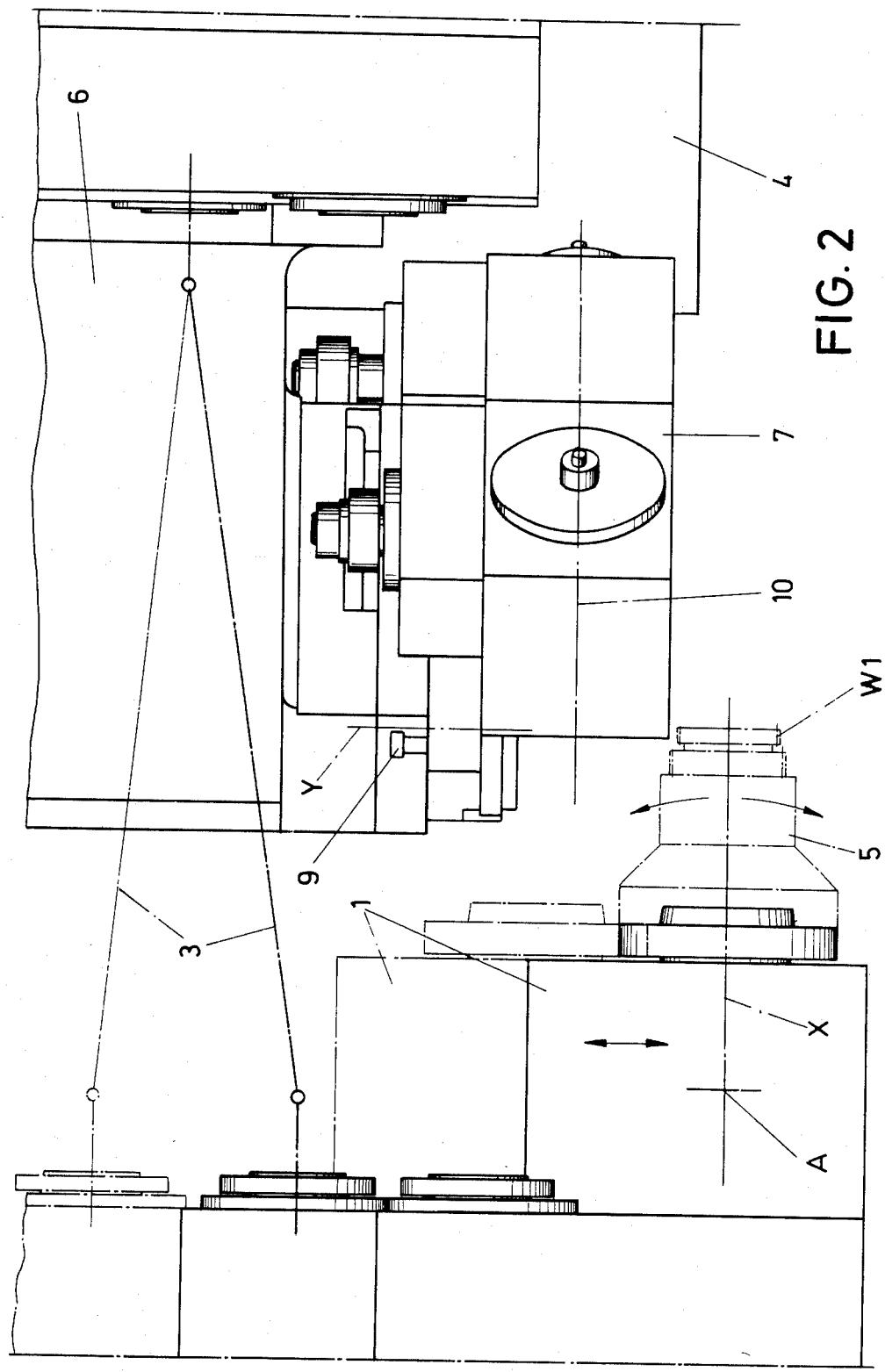
FIG. 2 is a top view of FIG. 1.

A work tool comprises a work carrier 1 which is displaceable, by means of a carriage 2 which is moveable along a rail, transverse to the axis of rotation X of a workpiece W1. Furthermore, movement of the work carrier 1 in the direction of the axis of rotation X of the workpiece is also possible. For this purpose, a universal-joint shaft 3 acts on the work carrier 1, the shaft, in its turn, extending from a stationary bearing block 4 on the machine side. Upon transverse displacement of the work carrier 1 the universal-joint shaft 3 passes into a different angular position; see the dash-dot showing in FIG. 2. In addition, the axis of rotation X of the work carrier can be swung around a vertical axis A in the directions indicated by the curved arrows in FIG. 2.

The work carrier 1 further comprises a chuck 5 by which both externally and internally toothed workpieces W1 (FIGS. 5–6, 9) and W2 (FIGS. 7–8) can be clamped.

Figure 1:
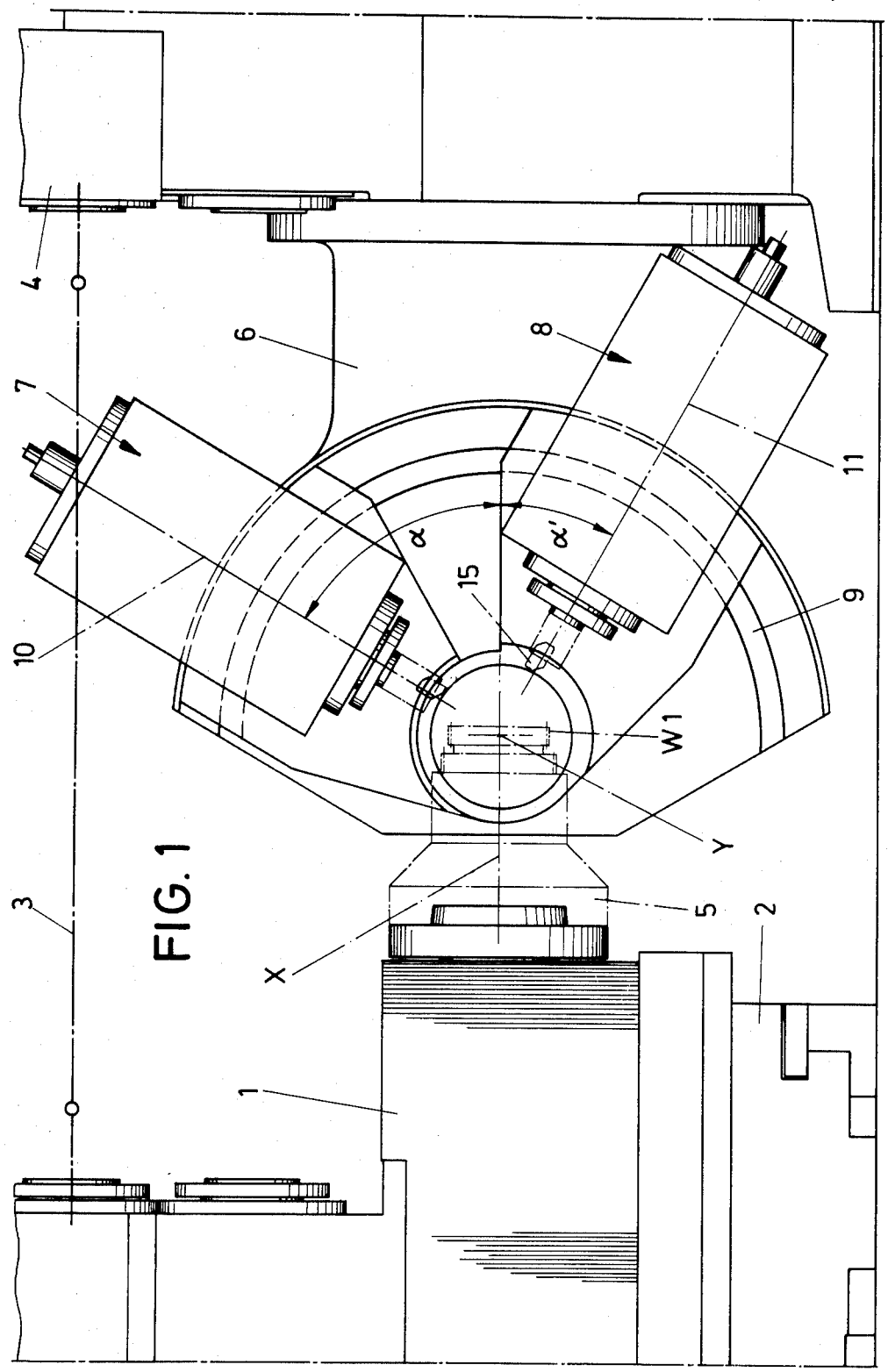
FIG. 1 is an elevational view of a machine tool within the working range of a workpiece and milling cutters.

The bearing block 4 is the supporting element for an arm 6 which extends in the direction towards the work carrier 1. This arm defines an axis Y which is perpendicular to the axis of rotation X of the workpiece. Around this axis Y there are arranged two carriers 7 and 8 which are swingable independently of each other and can be clamped in predetermined angular positions. For this purpose there is provided a groove 9 which extends concentrically to the axis of swing Y and into which clamping screws (not shown) of the carriers 7, 8 engage. The carriers 7, 8, receive rotary axes 10 and 11 of milling cutters 15 in such a manner that the rotary axes lie centrally to the axis of swing Y of the carriers. The arm 6 and the carriers 7, 8 are so dimensioned that the milling-cutter axes of rotation 10, 11 can be shifted within a region of 30° to 60°. FIG. 1 shows that the upper carrier 7 or its miller axis of rotation 10 is arranged at an angle alpha of 60° to the horizontal plane which passes through the axis of rotation X and the miller axis of rotation 11 of the other carrier 8 is arranged at an angle alpha' of minus 30° thereto.

By means of a gearing (not shown) arranged in the bearing block 4 and a gear chain connected therewith the milling cutters are driven, preferably in such a manner that the directions of rotation Z and Z1 (FIG. 6) around their rotary axes 10, 11 are reversible.

Figure 3:
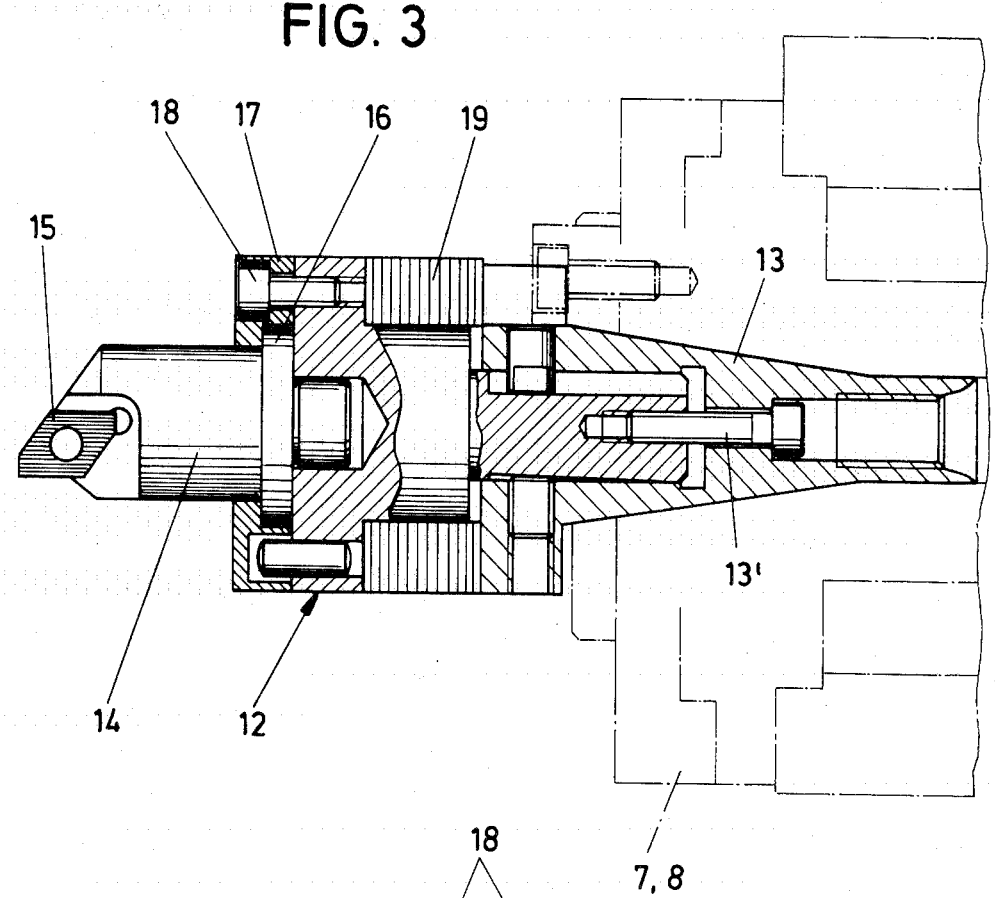
FIG. 3 is a partial longitudinal section through the carrier, showing the axial adjustability of the miller axis of rotation.
Figure 4:
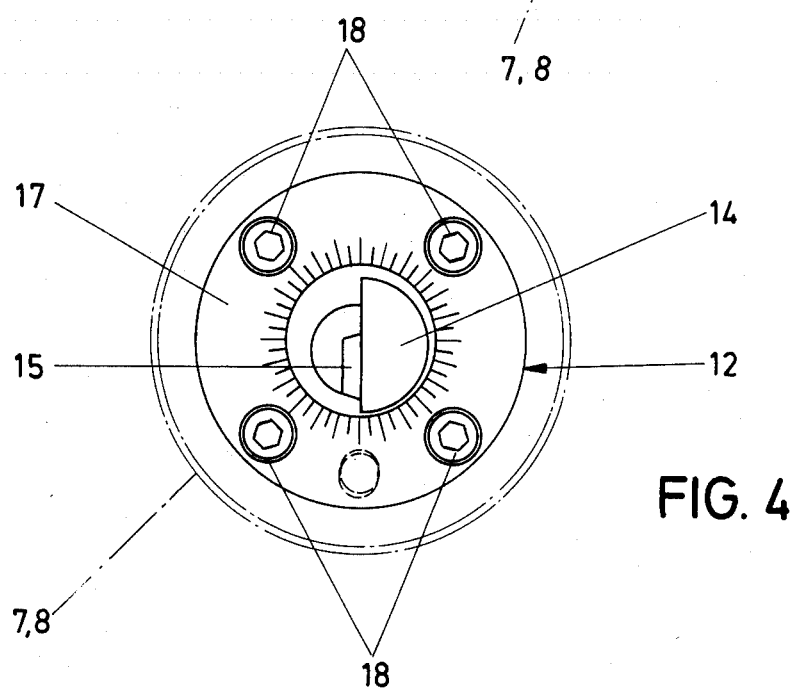
FIG. 4 is an end view of the milling cutter.

Each carrier 7, 8 carries a replaceable tool 12; see in particular FIG. 3. The tool has a conical mandrel 13 which can be inserted into a correspondingly shaped opening in the carrier 7, 8 and fastened there by means of a clamping screw 13'. The tool 12 carries an angularly adjustable holding pin 14. The milling cutter 15 is mounted on the holding point 14, the milling cutter being formed as a single-tooth fly cutter. The holding pin 14 continues into a collar 16 of larger cross-section over which a clamping plate 17 extends. Screws 18 arranged at equal angles apart serve to secure the clamping plate 17. After loosening the screws it is possible to bring the holding pin 14, together with the single-tooth fly cutter 15, into a proper angular position. Thereupon, the screws 18 are tightened so that the holding pin 14 remains in the position in which it has been placed.

Another manner of adjustability is provided on the tool 12. For this purpose, there is provided there a displaceable section 19 which makes it possible to displace the single-tooth fly cutter 15 in the longitudinal direction of the milling-cutter axis of rotation, namely centrally towards the carrier axis of swing Y.

If roof-shaped surfaces F and F1 are to be produced on the sides or face surfaces (flanks) of the teeth in the case of the externally toothed workpiece W1 shown in FIGS. 5 and 6, then the milling-cutter axes of rotation 10 and 11 must be brought, there by suitable swinging of the carriers 7 and 8 respectively, around the swing axis Y into the position shown in FIG. 6, in such a manner that the milling-cutter axes of rotation 10, 11 are at a suitable angle from the horizontal plane passing through the axis of rotation X of the workpiece. The single-tooth fly cutters 15 of the carriers 7, 8 then engage every fourth tooth and produce there, upon rotation of the workpiece W1 in the direction indicated by the arrow, surfaces F and F1 on the teeth, which surfaces are roof-shaped with respect to each other, with simultaneous advance of the work carrier 1 in the direction towards the bearing block 4. For the sake of greater clarity the corresponding surfaces F and F1 have been indicated by hatching in FIG. 5. Seen in FIG. 5 in the direction of the axis of rotation X of the workpiece, the single-tooth fly cutters move over an elliptical path (dot-dashed arrowed lines in FIG. 5). The corresponding directions of rotation Z and Z1 (FIG. 6) cause the single-tooth fly cutters 15 to work in the direction from an axially inwardly located base B of the teeth towards the axial face S of an axial free end E of the workpiece W1 so that any burr formation produced there is easy to remove. The milled teeth are tapered from the base B toward a ridge R of the teeth adjacent the face S.

FIG. 9 shows that the carriers 7, 8 of the carrier axes of rotation 10 and 11 have been also displaced spacially parallel to the carrier axis of swing Y in such a manner that the single-tooth fly cutters 15 act diametrically on the workpiece W1 and produce on the teeth the surfaces F and F1 which are roof-shaped with respect to each other.

Roof-shaped surfaces F and F1 can also be obtained in the case of the internally toothed workpiece W2. The milling-cutter axes of rotation 10, 11 and their carriers are to be brought into such a position that every third tooth is milled with its roof-shaped surface on the corresponding flank of the teeth. For better accessibility, a swinging of the axis of rotation X of the work carrier 1 can then be effected transverse to the carrier axis of swing Y.

In order to form surfaces 21 and 22 which are roof-shaped with respect to each other and have been shown with spherical development in FIG. 10, it is necessary to flute the single tooth fly cutter 15 on the flank facing the workpiece. One then obtains the curvature K. The curvature K1, which lies transverse to the curvature K, is, on the other hand, obtained by swinging the axis of rotation X of the work carrier 1 transverse to the carrier axis of swing Y.

Displacement of the axis of rotation X can also be effected if, with different angular positions of the axes of rotation, it is desired to work without changing the single-tooth fly cutters. The orbital planes of the single-tooth fly cutters can thereby be adapted to the axis of the workpiece.

I claim:

1. A method of milling, with at least one milling cutter, teeth surfaces at an axial free end of a continuously rotatably driven workpiece, comprising the steps of cutting the teeth on the continuously driven workpiece with axial relative movement between the workpiece and the milling cutter by the steps of,
rotating said milling cutter with constant speed relative to the rpm of the workpiece and in the direction of an axial face of the free end of the workpiece,
by rotating milling cutter milling a roof-like surface on one side of the teeth of the workpiece always starting from an axially inwardly located base of the teeth in a direction toward a ridge of the teeth in every milling, said roof-like surfaces of each tooth tapering toward each other away from the base of said each tooth toward said ridge adjacent said axial face of the free end of the workpiece.

2. The method according to claim 1, wherein
each roof-like surface of said teeth is shaped in a single said milling step.

3. A method for milling teeth surfaces with a machine tool which simultaneous mills a plurality of the surfaces from an axial free end of a continuously driven workpiece to form teeth therein, with axial relative movement between the workpiece and milling cutters which cut the continuously driven workpiece, said milling cutters being formed as single-tooth fly cutters, the milling cutters being driven in constant speed relationship to the revolution of the workpiece and the machine tool having two of said milling cutters, two carriers for said milling cutters having axes of rotation of the milling cutters, respectively, said two carriers being swingable, independently of each other, around a common carrier axis of swing, the method comprising the steps of adjusting said milling cutters in a longitudinal direction of the axes of rotation of the milling cutters centrally towards said carrier axis of swing,
sychronously driving said milling cutters with respect to each other such that directions of rotation thereof are opposite with respect to one another, are in the direction of an axial face of the free end of the workpiece and are such that one of the fly cutters mills a roof-like surface on one side of a tooth of the workpiece and simultaneously the other of said fly cutters mills an oppositely disposed roof-like surface of another tooth of the workpiece being milled, and such that the fly cutters always mill the respective roof-like surfaces of the teeth starting from an axially inwardly located base of the teeth in a direction toward a ridge of the teeth, the roof-like surfaces of each tooth tapering toward each other pointing away from the base of each tooth defining the ridge adjacent the face of the workpiece.

4. The machine tool as set forth in claim 3, wherein said milling step shapes said teeth in a single cutting operation.

* * * * *